United States Patent
Du et al.

(10) Patent No.: US 9,124,318 B2
(45) Date of Patent: Sep. 1, 2015

(54) SMART ANTENNA ARRAY CONFIGURATION FOR MULTIPLE-INPUT MULTIPLE-OUTPUT COMMUNICATIONS

(71) Applicant: QUALCOMM Incorporated, San Diego, CA (US)

(72) Inventors: Shu Du, Milpitas, CA (US); Qinghai Gao, Sunnyvale, CA (US); James Simon Cho, Mountain View, CA (US); Chin-Hung Chen, San Jose, CA (US); Didier Johannes Richard Van Nee, Tull en 't Waal (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/059,073

(22) Filed: Oct. 21, 2013

(65) Prior Publication Data

US 2014/0269964 A1    Sep. 18, 2014

Related U.S. Application Data

(60) Provisional application No. 61/785,983, filed on Mar. 14, 2013.

(51) Int. Cl.
*H04B 7/04* (2006.01)
*H04B 7/06* (2006.01)
*H04L 1/00* (2006.01)

(52) U.S. Cl.
CPC ............ *H04B 7/0452* (2013.01); *H04B 7/0617* (2013.01); *H04B 7/0691* (2013.01); *H04L 1/009* (2013.01)

(58) Field of Classification Search
CPC .... H04B 7/0452; H04B 7/0691; H04B 7/024; H04L 1/009
USPC ................... 375/260, 267, 299; 370/203–211
See application file for complete search history.

(56) References Cited

U.S. PATENT DOCUMENTS

| 8,374,096 | B2 | 2/2013 | Gu et al. |
|---|---|---|---|
| 2006/0270343 | A1 | 11/2006 | Cha et al. |
| 2011/0199968 | A1 | 8/2011 | Kim et al. |
| 2011/0273977 | A1* | 11/2011 | Shapira et al. ............... 370/208 |
| 2011/0305164 | A1* | 12/2011 | Zhang et al. ................. 370/252 |
| 2012/0026991 | A1 | 2/2012 | Niu et al. |

\* cited by examiner

*Primary Examiner* — Curtis Odom
(74) *Attorney, Agent, or Firm* — DeLizio Law, PLLC (57) ABSTRACT

An access point can include an array of antennas and a smart antenna selector. The smart antenna selector is configured to select a subset of antennas from the antenna array for use in multi-user multiple-input multiple-output (MU MIMO) data transmissions. Stations that are communicatively coupled to the access point can be selected for inclusion in a multi-user group based, at least in part, on performance measurements of the stations. Performance measurements are determined directly and indirectly from data transmissions sent in response to sounding packets. Antennas for use in MU MIMO data transmissions are selected for the antenna array based, at least in part, on previous antenna selections used for single user data transmissions.

15 Claims, 7 Drawing Sheets

United States Patent US 9,124,318 B2

SMART ANTENNA ARRAY CONFIGURATION FOR MULTIPLE-INPUT MULTIPLE-OUTPUT COMMUNICATIONS

RELATED APPLICATIONS

This application claims the priority benefit of U.S. Provisional Patent Application Ser. No. 61/785,983 filed Mar. 14, 2013.

BACKGROUND

Embodiments of the inventive subject matter generally relate to the field of communication systems and, more particularly, to selecting antennas from an array of antennas for use in multi-user multiple-input multiple-output data transmissions.

Multi-user multiple-input multiple-output (MU MIMO) data transmissions are described in some IEEE 802.11 draft specifications (e.g., IEEE 802.11ac). In brief, multiple data streams are transmitted from an Access Point (AP) to two or more stations (STAs) contemporaneously. For example, beamforming can be used to transmit a first data stream from the AP to a first STA and a second data stream from the AP to a second STA at approximately the same time. Some APs can include an array of antennas that can be used to transmit and/or receive wireless signals to and from the STAs. Beamforming techniques can be used to formulate multiple signals for transmission through multiple antennas to a STA. A beam of data is formed to the STA as the multiple signals constructively and destructively interfere with each other. MIMO techniques can also take advantage of multipath interference to increase data throughput by using additional pathways defined by the multipath interference. Although beamforming is relatively well understood, selecting antennas from the antenna array, particularly for use in MU MIMO data transmissions, can be less straightforward.

SUMMARY

Various embodiments are disclosed of an access point that includes a smart antenna selection module. In one embodiment, the access point can form a multi-user group from stations communicatively coupled to the access point based, at least In part, on performance measurements of stations within the multi-user group. A subset of antennas is selected from an antenna array included in the access point and data transmissions are received responding to sounding packets transmitted from the subset of antennas. Multi-user multiple-input multiple-output data is transmitted from the subset of antennas based on the received data transmissions responding to the sounding packets.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to IEEE 802.11ac draft specifications, any wireless system with beamformed or steered wireless signals can be used. In other instances, well-known instruction instances, protocols, structures and techniques have not been shown in detail in order not to obfuscate the description.

Multi-user multiple-input multiple-output (MU MIMO) data transmissions are described in some IEEE 802.11 draft specifications (e.g., IEEE 802.11 ac). Beamformed data streams may be transmitted from an Access Point (AP) to two or more stations (STAs) contemporaneously. Beamforming uses multiple data streams to focus or steer a wireless data transmission to the STAs. The beamformed data stream can be formed by constructive and destructive interference from multiple data streams. MIMO techniques can use multipath data transmission to increase data throughput. For example, beamforming and MIMO techniques can be used to transmit a first data stream from the AP to a first STA and a second data stream from the AP to a second STA at approximately the same time. Some APs can include an array of antennas that can be used to transmit and/or receive wireless signals to and from the STAs. If a number of antennas in the antenna array outnumber a number of receive and transmit processing pathways (commonly referred to as receive and/or transmit chains), selecting a subset of antennas from the antenna array for MU MIMO data transmissions can be difficult because of the number of possible combinations of antennas and receive chains.

One embodiment of an AP can select an initial set of antennas from an antenna array for use with MU MIMO data transmissions. The AP can form a multi-user group from STAs communicatively coupled to the AP, and can send sounding packets to the multi-user group. Sounding packets are well-defined data transmissions that are used to determine characteristics of a communication channel between the AP and the STAs. For example, a first station sends sounding packets to a second station. Since the sounding packets are defined ahead of time and known by the second station, the second station can inspect the sounding packets and determine how the communication channel has affected the transmission. The second station can send a report describing the communication channel to the first station. Sounding packets can also be used to determine beamforming parameters. The second station can include data in the report to enable the first station to formulate beamformed data streams.

In response to sending sounding packets, the AP can receive data transmissions that include acknowledgement packets (e.g., beamforming reports) from the STAs in the multi-user group. The AP can use the data transmissions to determine transmission characteristics of the communication channel and to form beamformed data transmissions to the multi-user group. The AP can then send beamformed data packets to the multi-user group and determine a performance measurement associated with transmitting and receiving the data packets. If the performance measurement is less than a performance threshold, then the access point can select a second set of antennas from the antenna array. In one embodiment, the performance threshold can be determined prior to AP operation. In another embodiment, the performance threshold can be adaptively determined by the AP.

Figure 1:
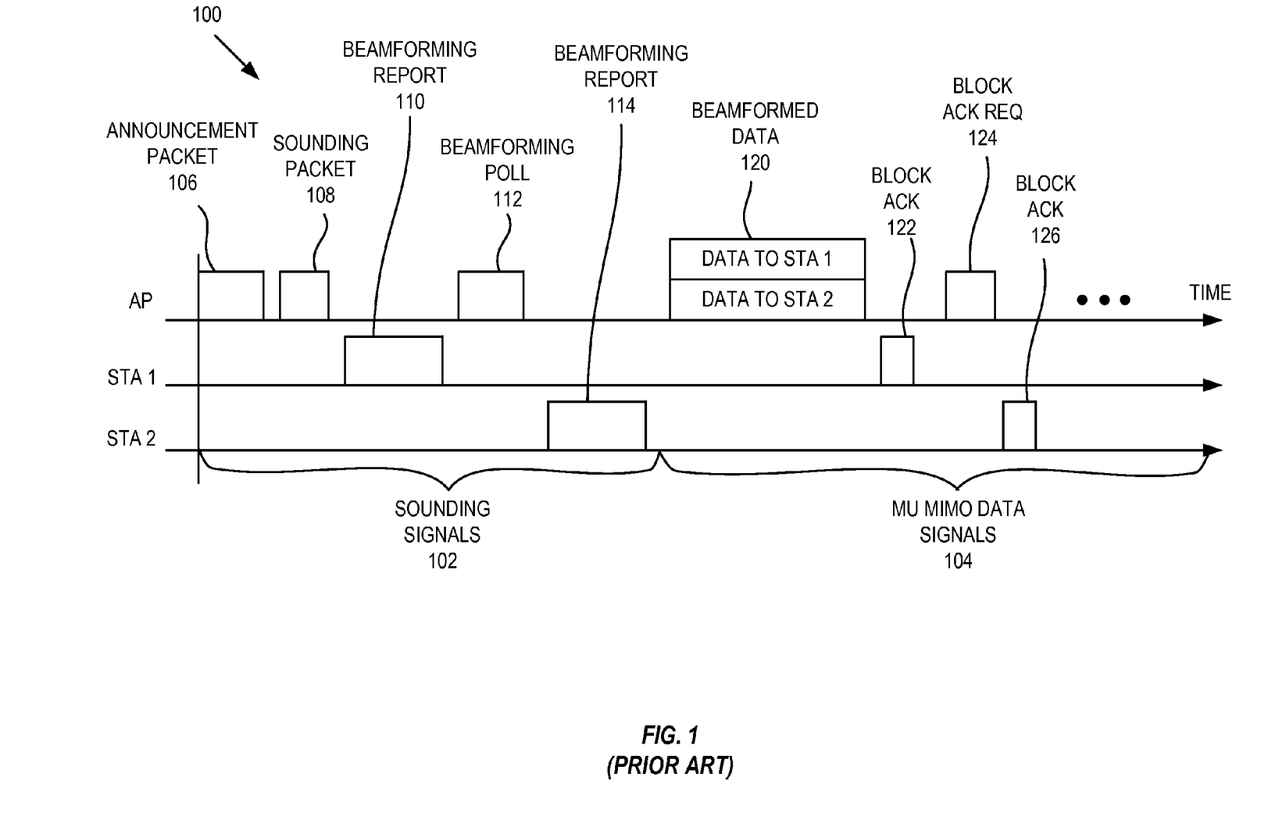
FIG. 1 is a prior art timing diagram showing a timing relationship between sounding signals and MU MIMO data transmission signals.

Data transmissions between the AP and STAs included in a multi-user group can be divided into two periods: a sounding period and a data transmission period. FIG. 1 is a prior art timing diagram 100 showing a timing relationship between sounding signals 102 (sounding period) and MU MIMO data transmission signals 104 (data transmission period) as may be observed in accordance with a version of the IEEE 802.11ac draft specification. Sounding signals 102 include an announcement packet 106 alerting STAs that a sounding packet 108 is forthcoming.

STAs in the multi-user group can respond to the sounding signals 102 with a beamforming report 110. The beamforming report 110 is a data transmission from a STA in the multi-user group that includes information describing the communication channel and information describing multi-path interference. In the timing diagram 100, only two STAs are shown to avoid obfuscating the inventive subject matter. An AP can form a multi-user group with more than two STAs. As shown in FIG. 1, after receiving the sounding packet 108, STA 1 responds with a beamforming report 110. The AP polls for more beamforming reports from other STAs with a beamforming poll packet 112. In response, STA 2 transmits a beamforming report 114. As described above, the AP can use the information in the beamforming reports to determine beamforming parameters to create a MU MIMO data transmission to the multi-user group. In one embodiment, beamforming reports can include performance measurements such as received signal strength indicators (RSSI) and signal to noise ratio (SNR) information. In other embodiments, RSSI and SNR information can be determined by measuring RSSI and SNR directly from the beamforming reports 110 and 114.

MU MIMO data transmission signals 104 include a beamformed data 120 packet that is sent to the STAs in the multi-user group. As shown, the AP sends data to both STA 1 and STA 2 at substantially the same time. After receiving the beamformed data 120, STA 1 responds with a block acknowledgement 122. The AP sends a block acknowledgement request 124 to other STAs in the multi-user group. In this example, STA 2 responds with a block acknowledgement 126. Because of the overhead related to transmitting MU MIMO data (such as the sounding signals 102), the sequence of signals depicted as multiple MU MIMO data transmission signals 104 is often repeated multiple times to send additional data through one or more additional beamformed data packets (not shown). The beamforming parameters determined from the beamforming reports are "reused" for successive beamformed data transmissions. This is illustrated with the ellipsis in FIG. 1.

As will be described below, the AP can use information included within the beamforming reports 110 and 114 as well as indirect information gathered as a result of receiving the beamforming reports 110 and 114 to form multi-user groups for MU MIMO data transmissions and guide antenna selection for antennas included in an antenna array.

Figure 2:
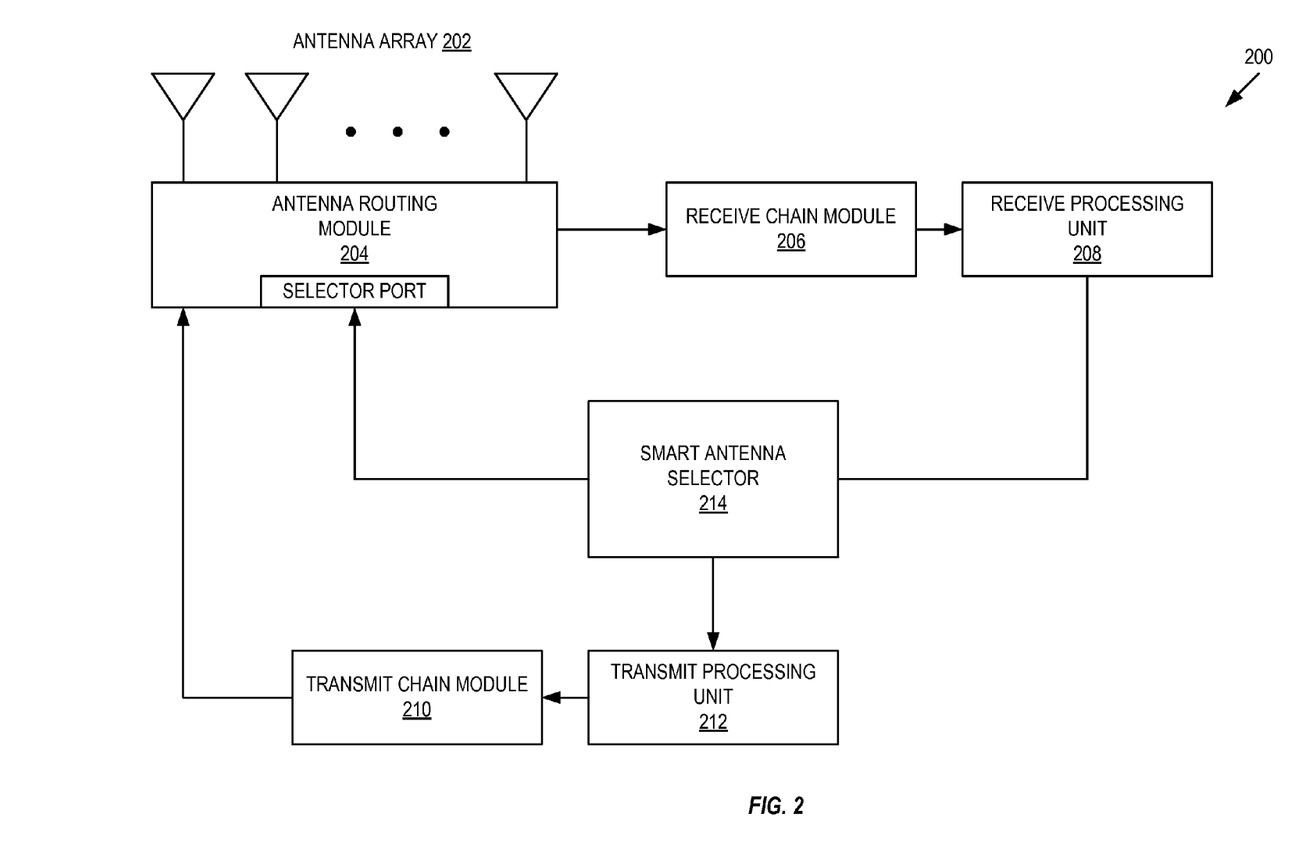
FIG. 2 is a simplified block diagram of an example AP configured to transmit MU MIMO data transmissions through an antenna array selected by a selector.

FIG. 2 is a simplified block diagram of an example AP 200 configured to transmit MU MIMO data transmission signals 104 through an antenna array 202. The AP 200 includes the antenna array 202, coupled to an antenna routing module 204. The antennas included in the antenna array 202 can be directional antennas configured to preferentially receive and transmit signals in a specific direction. The antenna routing module 204 couples selected antennas to a receive chain module 206. Antennas can be selected through a selection port as will be described below. The receive chain module 206 can include a predetermined number of receive chains. For example, receive chain module 206 can include 4 receive chains. Other embodiments of the inventive subject matter can be implemented in APs with receive chain modules that can include more or fewer receive chains. Each receive chain in the receive chain module 206 can include analog and digital signal processing modules (not shown) arranged to receive and process received wireless signals. Examples of the analog and digital signal processing modules include variable gain amplifiers, analog-to-digital converters, automatic gain controllers, digital filters (all not shown) and the like. The output of the receive chain module 206 is coupled to a receive processing unit 208.

The receive processing unit 208 can determine characteristics of a received signal (packet), such as the sounding signals 102 and MU MIMO data transmission signals 104. The receive processing unit 208 can determine a packet error rate of the received signal. The packet error rate can be a ratio of erroneous packets received to a number of total packets received. In some cases, packets are transmitted with error correction codes, such as a forward error correction (FEC) codes. Although forward error correction codes can allow the receive chain module 206 and/or the receive processing unit 208 to correct some errors, not all errors may be correctable. Thus, the packet error rate can provide a quality measurement associated with the reception of signals at the AP 200.

The receive processing unit 208 can also determine an average throughput data rate. For example, the receive processing unit 208 can monitor received data, maintain statistics on the received data, and determine the average throughput data rate. The receive processing unit 208 can determine a modulation coding scheme (MCS) value associated with the received data. The MCS value can describe how data is encoded (modulated) when transmitted through a communication channel. The MCS value can represent different modulation attributes that are used to transmit data. For example a first MCS value may represent 16 QAM modulation, and include a ½ coding rate (e.g., for the forward error correction) and a predefined guard interval (spacing interval) between transmitted symbols. A second MCS value may be greater than the first MCS value and may represent a high modulation such as 64 QAM. Thus, the packet error rate, the average throughput data rate, and the determined MCS value can provide other quality measurements associated with the reception of signals at the AP 200. The receive processing unit can also determine other communication channel characteristics such as beamforming parameters.

The AP 200 includes a transmit processing unit 212. The transmit processing unit 212 can provide sounding packet information (such as information related to the sounding signals 102) to a transmit chain module 210. Sounding packets can be used to determine, among other things, beamforming settings and parameters for transmit chains included in the transmit chain module 210 for transmission of MU MIMO data to STAs included in a multi-user group. The transmit chain module 210 can include a predetermined number of transmit chains. For example, transmit chain module 210 can include 4 transmit chains. Other embodiments of the inventive subject matter can be implemented in APs with transmit chain modules that have more or fewer transmit chains. Each transmit chain in the transmit chain module 210 can include digital and analog signal processing modules (not shown) arranged to process signals for wireless transmission. The output of the transmit chain module 210 is coupled to the antenna routing module 204. The antenna routing module 204 routes the signals from the transmit chain module 210 to the selected antennas in the antenna array 202. In some implementations, the predetermined number of receive chains is equal to the number of predetermined transmit chains in the AP 200.

The AP 200 also includes a smart antenna selector 214. The smart antenna selector 214 is coupled to the receive processing unit 208, the transmit processing unit 212 and the antenna routing module 204. The smart antenna selector 214 can select STAs to form the multi-user group and select antennas in antenna array 202 for use in MU MIMO data transmission signals 104. In some implementations, the smart antenna selector 214 can select a subset of STAs communicatively coupled to the AP 200 to form a multi-user group. As described above, the multi-user group can be configured to receive MU MIMO data streams from the AP 200. Selection of the subset of STAs can be based, at least in part, on station Doppler profiles, previously used MCS values associated with the STAs, packet error rates and STA data queue depth. A Doppler profile can provide information related to communication stability of an STA. An STA with a larger Doppler profile than other STAs can have commensurately more movement and, therefore, be a poor candidate for the multi-user group. On the other hand, an STA with a smaller Doppler profile than other STAs can have less movement and, therefore, be a better candidate for the multi-user group.

MCS values associated with STAs can determine, at least in part, groupings for the multi-user group. Common or similar MCS values can indicate similar communication channel conditions for the STAs. Thus, the STAs associated with a common or similar MCS value can be better candidates for a multi-user group than STAs with differing MCS values. In some embodiments, members of a multi-user group can have dissimilar MCS values, however.

The smart antenna selector 214 can form a multi-user group based, at least in part, on packet error rates (PERs) associated with STAs. Similar PERs can indicate similar channel conditions to individual STAs. Similar channel conditions can indicate that MU MIMO data transmission signals 104 can be similarly received by those STAs and, therefore, those STAs may be better candidates for a multi-user group than STAs with different PERs.

The smart antenna selector 214 can form a multi-user group based, at least in part, on data queue depths associated with STAs. The data queue depth can provide an indication of an amount of data traffic associated with a STA. STAs with similar data queue depths suggest that those STAs may receive similar amounts of data and, therefore, may be grouped together. Thus, STAs with similar data queue depths can be better candidates for a multi-user group than STAs with dissimilar data queue depths.

In some embodiments, the smart antenna selector 214 selects a subset of antennas included in the antenna array 202 for use with MU MIMO data transmission signals 104. The smart antenna selector 214 can select antennas through a selector port included in the antenna routing module 204. The number of selected antennas can be equal to the number of receive or transmit chains included in the receive chain module 206 or the transmit chain module 210, respectively. For example, if the receive chain module 206 includes four receive chains and transmit chain module 210 includes four transmit chains, then the smart antenna selector 214 can select four antennas from the antenna array 202. In other embodiments, different numbers of antennas can be selected.

After the antennas in the antenna array 202 are selected, the sounding packet 108 is sent from selected antennas at the AP 200 to determine, among other things, beamforming parameters for the beamformed data 120. Since the beamforming parameters are specific to a particular antenna selection, the antennas selected for use in sending the sounding packets are also used during the beamformed data 120.

In some embodiments, an antenna selector selects an initial subset of antennas for use with MU MIMO data transmission signal 104 based on antennas used to previously communicate with a primary STA. In some embodiments, prior to sending the beamformed data 120, the AP 200 sends data in a single user communication (i.e., the AP 200 is configured in a single user configuration and sends unicast data to one STA). When the AP 200 sends data in the single user communication, the AP 200 can determine a primary STA as the STA that is involved in a majority of data transactions. Antennas used to transmit data to the primary STA can be used as an initial antenna selection, particularly when the primary STA is included in the multi-user group.

In some embodiments, the antenna selector selects the initial subset of antennas used with MU MIMO data transmission signals 104 based, at least in part, on antennas used by the AP 200 to provide single user communications to stations included in the multi-user group. For example, a multi-user group can include STA 1, STA 2 and STA 3. Single user communications to STA 1 uses antennas A, B, C and D. Similarly, single user communications to STA 2 use antennas A, B, C and E. Finally, single user communications to STA 3 use antennas A, B, C and F. In this example, an initial subset of antennas can include antennas A, B and C since these antennas are commonly used for single user communication across STA 1, STA 2 and STA 3.

The smart antenna selector 214 can cause the announcement packet 106 and the sounding packet 108 to be sent to the multi-user group though the selected antennas in the antenna array 202. The transmit processing unit 212 can generate the announcement packet 106 and the sounding packet 108 and provide the packets to the transmit chain module 210. When the STAs in the multi-user group receive the sounding packet 108, the STAs can respond with data transmissions such as beamforming reports 110 and 114 sent to the AP 200. The beamforming reports 110 and 114 can include information that can enable the AP 200 to send the beamformed data 120 to each STA included in the multi-user group as described, for example, in the draft specification for IEEE 802.11ac.

After beamforming parameters are determined from the beamforming reports 110 and 114, the AP 200 can send the beamformed data 120 to STAs included in the multi-user group. Since sending the beamformed data 120 can include more overhead than sending single user data, multiples of data packets are often sent as opposed to a single packet. In one embodiment, multiple data packets can help reduce the overhead burden of the MU MIMO setup.

After the beamformed data 120 is transmitted, smart antenna selector 214 can compare a performance measurement to a performance threshold. The performance measurement can be based on one or more of the MCS values used during the beamformed data 120 transmission, the average data throughput rate and the packet error rate (PER). The performance measurement can provide a measure of quality associated with the beamformed data 120 transmission. Larger performance measurements can indicate better quality data transmissions. For example, if a MCS values associated with a first beamformed data transmission is greater than a MCS value associated with a second beamformed data transmission (not shown), then the performance of the first beamformed data transmission is better than the performance of the second beamformed data transmission because of the higher order modulation scheme used in the first beamformed data transmission. Similarly, if the average data throughput of the first beamformed data transmission is greater than the average data throughput of the second beamformed data transmission, then the performance of the first beamformed data transmission is better than the performance of the second beamformed data transmission since the average data rate of the first beamformed data transmission is higher than the average data rate of the second beamformed data transmission. Also, if the PER of a first beamformed data transmission is lower than the PER of a second beamformed data transmission, then the performance of the first beamformed data transmission is greater than the performance of the second beamformed data transmission since the first beamformed data transmission has a lower error rate.

The performance measurement provides an indication of performance related to a multi-user group. The MCS value, average throughput rate and PER for each STA included in the multi-user group is determined and can be combined to form the performance measurement. In some implementations, the performance measurement can be based, at least in part, on the MCS value, the average throughput rate and the PER separately, or in combination. The performance measurement can be a weighted average of the MCS value (where, the MCS value may itself be a weighted or unweighted average of MCS values used by the STAs in the multi-user group), the average throughput rate and the packet error rate. In other implementations, the performance measurement can be based, at least in part, on other indicators such as a number of packet acknowledgements or a number of packet retries. In one embodiment, the performance threshold is predetermined prior to operation of the AP 200. In another embodiment, the performance threshold is adaptively determined by the AP 200.

As described above, after sending the beamformed data 120, the AP 200 can compare the performance measurement to the performance threshold. If the performance measurement is less than the performance threshold, then the quality of the beamformed data 120 transmission may be unacceptable. In response, the smart antenna selector 214 can select a different subset of antennas from the antenna array 202. The smart antenna selector 214 can cause the sounding packet 108 to be sent through the transmit processing unit 212 and the transmit chain module 210 to determine beamforming parameters associated with the new antenna configuration (i.e., a new subset of antennas selected from the antenna array 202). Beamformed data 120 transmissions can be sent through the new antenna configuration.

Figure 3:
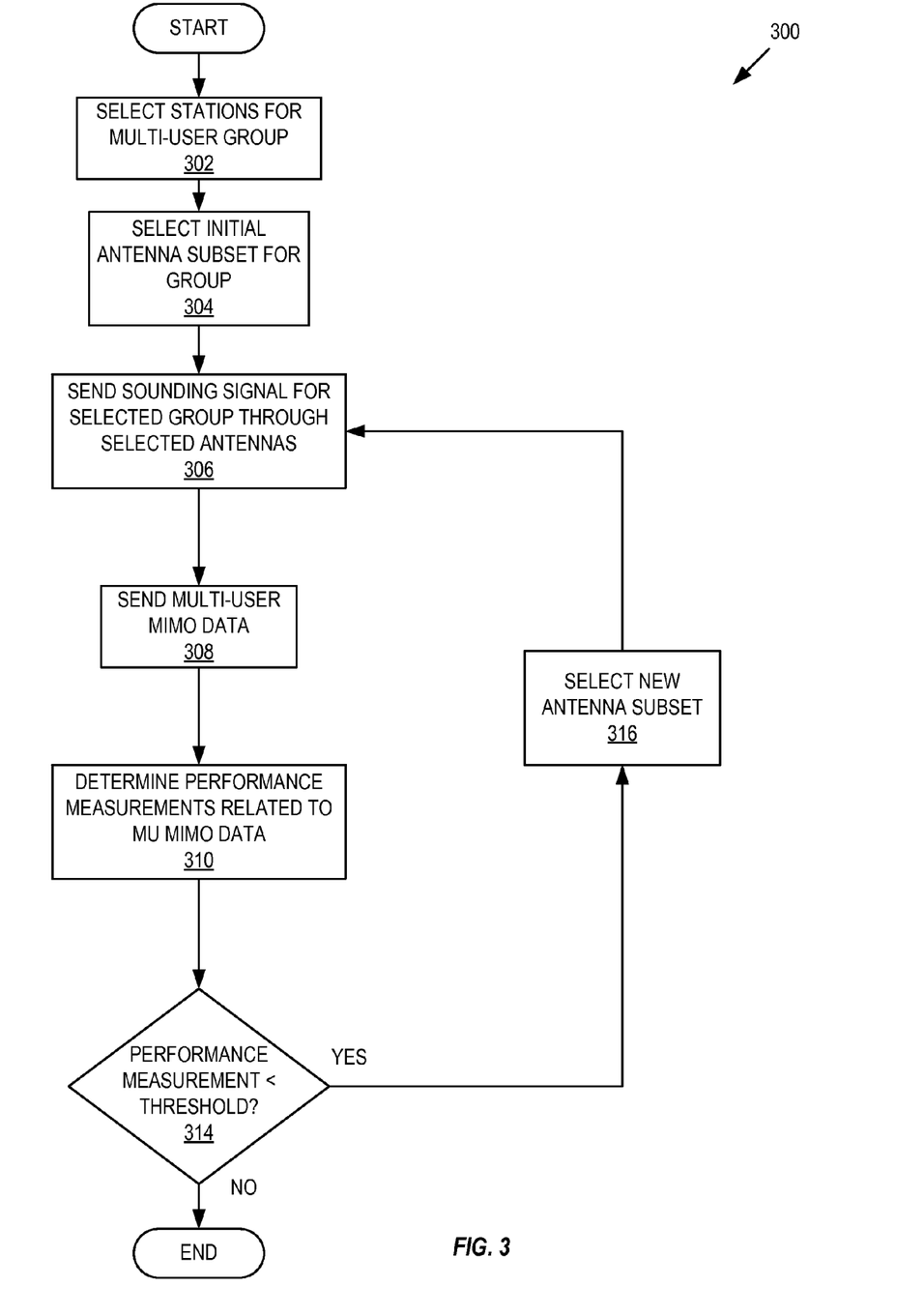
FIG. 3 is a flow diagram illustrating example operations for dynamic selection of antennas from an antenna array for MU MIMO transmissions.

FIG. 3 is a flow diagram 300 illustrating example operations for dynamic selection of antennas from an antenna array 202 for MU MIMO transmissions. The example operations can be carried out by one or more components in the AP 200, such as, but not limited to the smart antenna selector 214 or by a processor within the AP 200 or included within the smart antenna selector 214.

The flow begins in block 302, where a subset of STAs that are communicatively coupled to the AP 200 are selected to be included in a multi-user group. As described above, STAs can be selected to be included in the multi-user group based, at least in part, on performance measurements. Performance measurements for an STA can be measured with Doppler profiles, previously used MCS values associated with the STAs, STA data queue depth, received signal strength, signal to noise ratio, and/or packet error rates. Proceeding to block 304, an initial subset of antennas is selected from the antenna array 202. Antenna selections can be based, at least in part, on antennas that were also used in sending data to a primary STA, or antennas that are commonly used in single user data transmissions across STAs included in the multi-user group. Antennas can be randomly selected from the antenna array 202.

Proceeding to block 306, the sounding signals 102 are transmitted between the AP 200 and the STAs included in the multi-user group formed in block 302. Proceeding to block 308, the beamformed data 120 is sent from the AP 200 to STAs in the multi-user group in accordance with beamforming reports 110 and 114 received from the STAs. Proceeding to block 310, the AP 200 determines one or more performance measurements for guiding antenna selection based on the beamforming reports. Example performance measurements can be derived from beamforming reports and include average data throughput, packet error rate, and/or MCS values related to the beamformed data 120 transmissions. The performance measurement provides an indication of performance for the multi-user group using the currently selected antennas. Proceeding to block 314, the performance measurement is compared to the performance threshold. If the performance measurement is less than the performance threshold, then the method can proceed to block 316 where a new subset of antennas is selected from the antenna array 202 and flow returns to block 306. On the other hand, if the performance measurement is not less than the performance threshold, then the flow ends.

In some implementations, block 314 can be executed periodically. Communication channel conditions can change over time, rendering the currently selected antennas poorly suited for data transmissions to the multi-user group. Periodically reviewing the performance measurement can help allow antenna selection to adapt to the changes accordingly.

FIGS. 2 and 3 describe the operations of the AP 200 and the smart antenna selector 214 responsive to a single group of the sounding signals 102. In some embodiments, multiple groups of the sounding signals 102 corresponding to different antenna selections can be transmitted between the AP 200 and the multi-user group. The responses from the multi-user group can be used to select antennas from the antenna array 202 for use with the beamformed data 120 transmissions. A timing diagram showing the multiple groups of sounding signals is shown below in FIG. 4.

Figure 4:
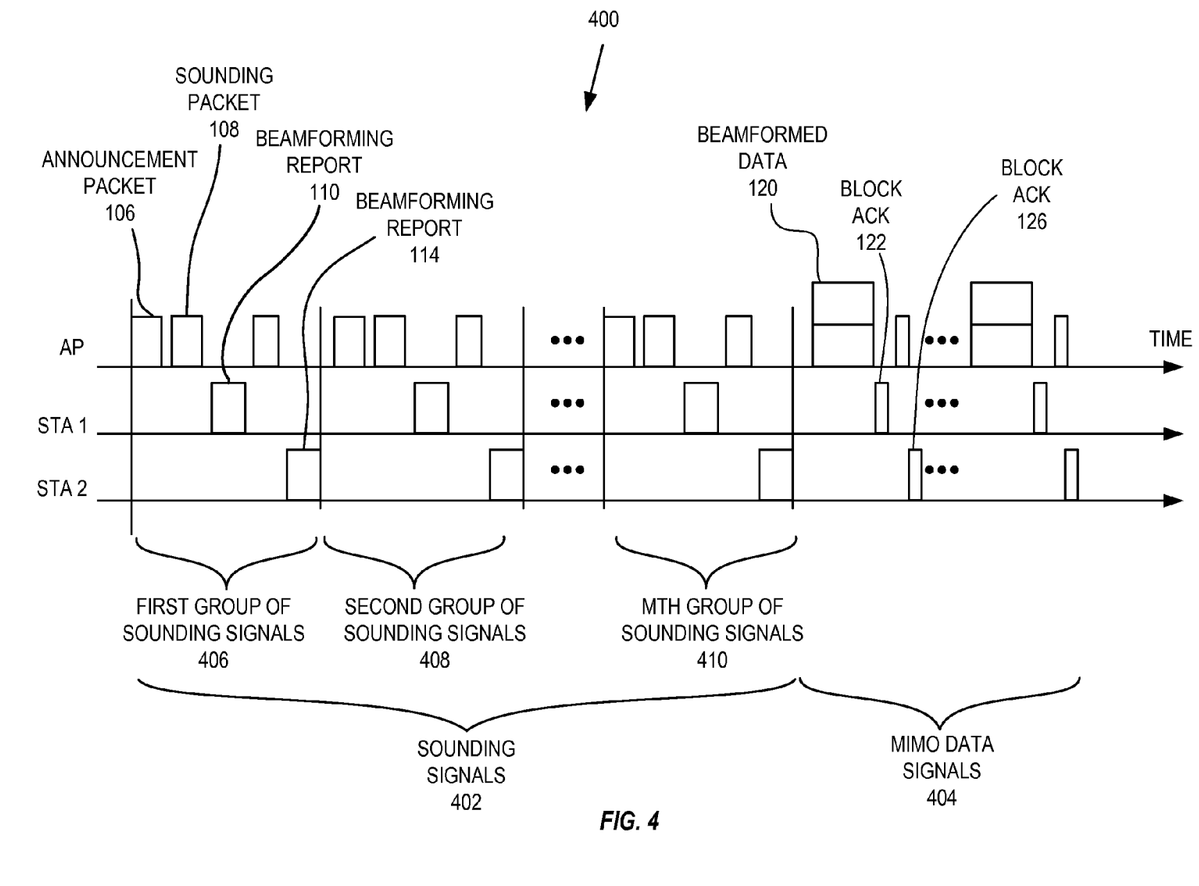
FIG. 4 is an example timing diagram showing a timing relationship between multiple groups of sounding signals and MU MIMO data transmission signals.

FIG. 4 is an example timing diagram 400 showing a timing relationship of multiple groups of sounding signals 402 and MU MIMO data transmission signals 404. A first group of sounding signals 406 can be sent with a first subset of antennas selected from the antenna array 202. The first group of sounding signals 406 can be similar to the sounding signals 102 shown in FIG. 1. For example, the announcement packet 106 and the sounding packet 108 can be sent to the multi-user group. The AP 200 can receive the beamforming reports (110 and 114 described above) in response to the sounding packet 108. Following the first group of sounding signals 406, a second group of sounding signals 408 using a second subset of antennas is sent between the AP 200 and the multi-user group. The AP 200 can receive additional beamforming reports responsive to sounding packets included in the sounding signals 408. The number of groups of sounding signals can continue to "M" (e.g., a predefined number) times. After the Mth group of sounding signals 410, the AP 200 can select a subset of antennas from antenna array 202 based, at least in part, on information included in the received beamforming reports from the sounding signals 406-410. The AP 200 transmits beamformed data 120 from the selected subset of antennas. The block acknowledgments 122 and 126 are received by the AP 200.

In some implementations, the beamforming reports 110 and 114 can include performance measurements such as received signal strength information and signal to noise information. In some implementations, the number of groups of sounding signals is not exhaustive, since the possible combinations and arrangements of antenna subsets can be large, especially as the number of antennas included in the antenna array 202 increases. In some implementations, the number of sounding signal groups (m groups in this example) can be determined by a predetermined time period. In one embodiment, multiple groups of sounding signals can be sent when initially establishing MU MIMO data transmissions.

Figure 5:
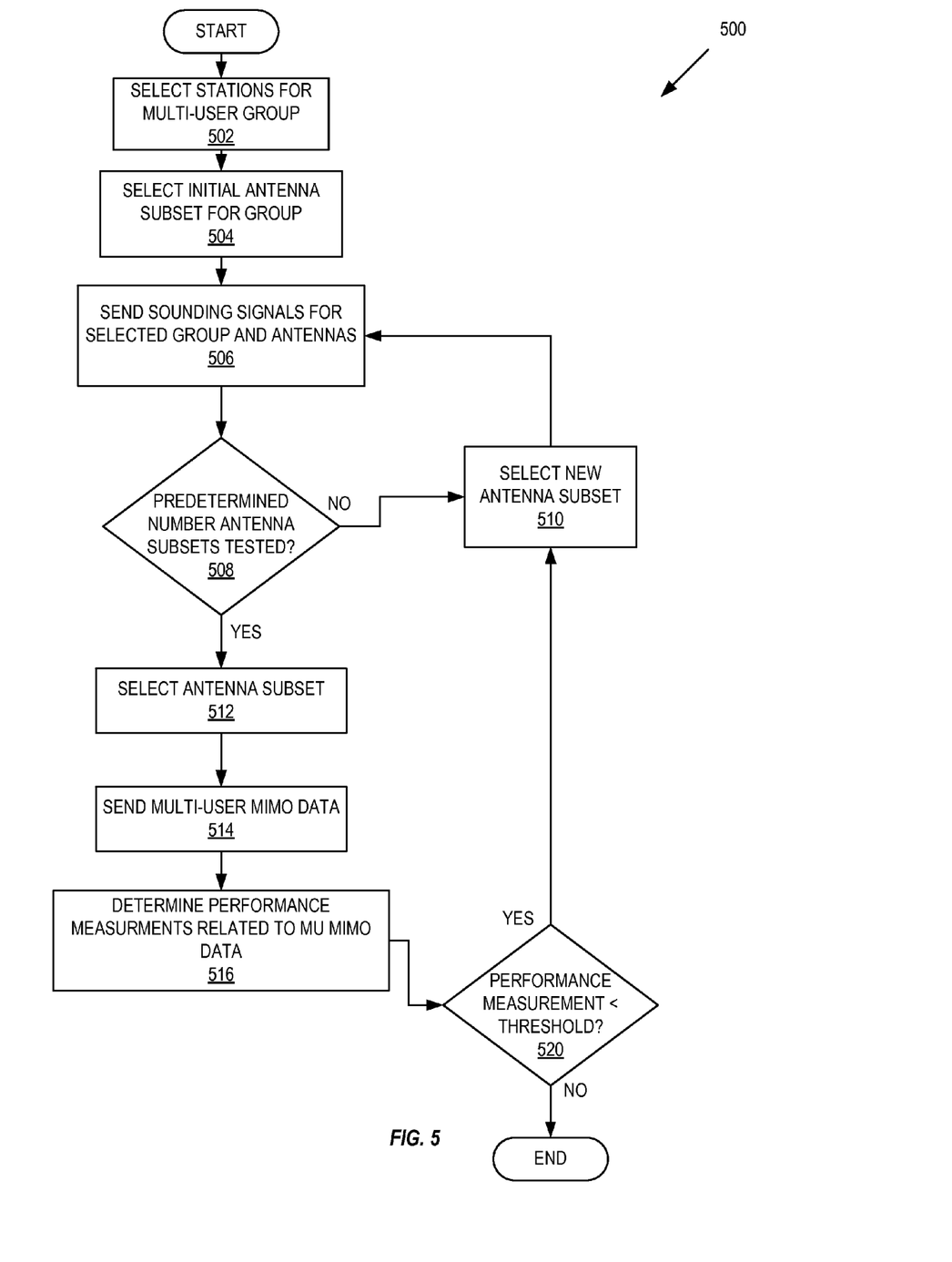
FIG. 5 is a flow diagram illustrating another embodiment of example operations for the access point including the smart antenna selector.

FIG. 5 is a flow diagram 500 illustrating another embodiment of example operations for the AP 200 including the smart antenna selector 214. The example operations can be carried out by one or more components in the AP 200, such as, but not limited to, the smart antenna selector 214 or by a processor within the AP 200 or included within the smart antenna selector 214.

The flow begins in block 502 where a subset of STAs is selected to be included in a multi-user group. As described above, STAs can be selected to be included in the multi-user group based, at least in part, on performance measurements such as Doppler profiles, previously used MCS values associated with the STAs, STA data queue depth, received signal strength, signal to noise ratio and/or packet error rates. Proceeding to block 504, an initial subset of antennas is selected from the antenna array 202. In one implementation, block 502 and block 504 can be substantially similar to block 302 and 304 as described above respectively. Proceeding to block 506, the sounding signals 102 are transmitted between the AP 200 and the STAs included in the multi-user group. Beamforming reports from the sounding signals 102 can be stored in the AP 200. Proceeding to block 508, the AP 200 determines if a predefined number of different antenna subsets have been tested. The predetermined number can be related to an arbitrary amount of time. For example, the testing of antenna subsets can relate to the number of tests that can be performed in a given time period. If the predetermined number of antenna configurations has not been tested, then proceeding to block 510, a new subset of antennas (different from a previously selected antenna subset) is selected. Flow can return to block 506.

Returning to block 508, if the predetermined number of antenna subsets have been tested, then in block 512 one of the tested subsets of antennas is selected for use with beamformed data 120 transmissions. The selected subset is based, at least in part, on the beamforming reports 110 and 114 that were sent from the STAs in the multi-user group included in the sounding signals 102 sent between the AP 200 and STAs in the multi-user group.

Proceeding to block 514, MU MIMO data (beamformed data 120) is sent from the AP 200 to STAs in the multi-user group in accordance with beamforming reports 110 and 114 received from the STAs. Proceeding to block 516, the AP 200 determines a performance measurement such as average data throughput, packet error rate and MCS value related to the beamformed data 120 transmissions. In one embodiment, block 516 can be substantially similar to block 310 described above where average data throughput, packet error rate and MCS values are performance measurements related to data transmission between the AP 200 and STAs in the multi-user group. Proceeding to block 520, the performance measurement is compared to the performance threshold. If the performance measurement is less than the performance threshold, then the flow can proceed to block 510 where a new subset of antennas is selected from the antenna array 202. If, on the other hand, the performance measurement is not less than the performance threshold, then the flow can end.

The beamforming reports 110 and 114 received from the predetermined number of sounding signals 102 received in block 506 can be used to narrow a search for the subset of antennas. For example, after sending the predetermined number of sounding signals 102, the AP 200 can return and retest (by re-sending the sounding packet 108, for example) a subset of the predetermined number of antenna subsets previously tested.

In some implementations, a channel correlation coefficient, received signal strength indicator and signal to noise ratio can be used separately or in combination to guide antenna selection in block 504 or block 512. These channel and signal characteristics can be derived from beamforming reports, and also may be determined by performing the operations of blocks 512-516 described above. The channel correlation coefficient describes a similarity between communication channels between two STAs. If a channel correlation coefficient indicates a strong correlation between a first communication channel used by the AP 200 and a first STA and a second communication channel used by the AP 200 and a second STA, then the antenna subset used for the first communication channel and the second communication channel can be a poor choice for MU-MIMO data transmissions. Strongly correlated communication channels indicate that the communication channels are similar and that the first STA may be too similar (in location, for example) to the second STA. Successful transmission and reception of the beamformed data 120 may be difficult when communication channels for targeted STAs are too similar to each other. Received signal strength indicator can identify the observed signal strength of the sounding packet 108 at an STA. Common or similar received signal strengths can indicate that the antennas used for first STA and the second STA may be a good antenna choice for the multi-user group. The signal to noise ratio can identify the observed signal to noise ratio of the sounding packet 108 at the STA. Common or similar signal to noise ratios can indicate that the antennas used for the first STA and the second STA may be good antenna choices of the multi-user group.

In one embodiment, the channel correlation coefficient can be based, at least in part on signal-to-noise values and eigenvectors received from stations in a multi-user group. A matrix H can be used to calculate beamforming weights for use by an access point configured to send MU MIMO data transmissions.

$$H = \begin{bmatrix} S_1 V'_1 \\ \ldots \\ S_K V'_K \end{bmatrix}$$

where $S_K$ is the signal to noise ratio of the channel at the Kth station and $V_K$ is the eigenvector of the channel of the Kth station.

The channel correlation coefficient can be determined by calculating an inner product of each pair of rows in H. If there are several pairs of rows exhibiting a high correlation (i.e., a high inner product), then the current antenna configuration may not suitable for use with the multi-user group. For example, if the number of pairs of rows indicating a high correlation is greater than a threshold, then the current antenna subset may be unsuitable for the particular multi-user group. In another embodiment, the channel correlation can be determined by calculating a condition number of H. If H is ill-conditioned (the condition number is large), then a strong correlation between members of the multi-user group is determined. Calculation of the condition number can be implementation specific.

Figure 6:
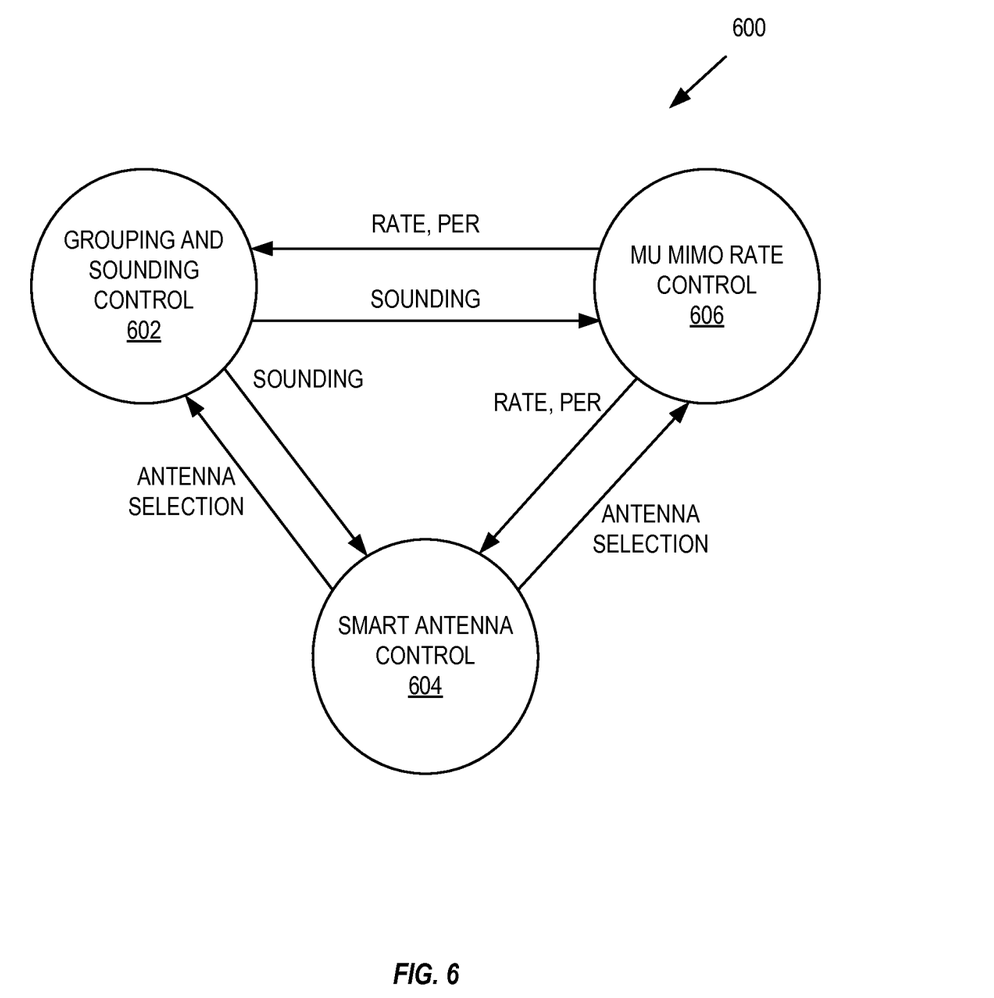
FIG. 6 is a diagram showing interactions of modules in one embodiment the access point.

FIG. 6 is a diagram 600 showing interactions of modules in one embodiment the AP 200. Module diagram can include a grouping and sounding control module 602, a MU MIMO rate control module 606 and a smart antenna control module 604. In one implementation, the grouping and sounding control module 602 can include operations related to forming multi-user groups and operations related to sending the sounding signals 102. For example, operations related to forming multi-user groups can be similar to those described in accordance with block 302 in FIG. 3 and block 502 in FIG. 5. Operations related to sending the sounding signals 102 can be similar to those described in accordance with block 306 in FIG. 3 and block 506 in FIG. 5. Changes to groupings of STAs included in a multi-user group, and therefore operations of the grouping and sounding control module 602, can be infrequent. That is, once STAs are selected for use in a multi-user group, the selections of STAs are not likely to change quickly.

The smart antenna control module 604 can include operations related to selecting a subset of antennas for use in a MU MIMO data transmission. In one embodiment, operations related to selecting a subset of antennas can be similar to those described in block 304 in FIG. 3 and block 510 in FIG. 5. In one implementation, changes to antenna subset selection can be made more frequently than changes related to groupings (the grouping and sounding control module 602). More frequent changes can be due, in part, to the transient nature of the communication environment, such as temporary blockers or other impairments introduced into the communication channel.

MU MIMO rate control module 606 can include operations related to selecting a MCS value for a data transmission. MCS values (and therefore data transmission rates) can fluctuate rapidly and can vary with changes in channel conditions. For example, when packets included in a MU MIMO data transmission signal 104 is sent, AP 200 can change the MCS value on a packet by packet basis to accommodate changing channel and operating conditions. In another example, a MCS value can be decreased when the packet error rate rises above a predetermined amount. On the other hand, a MCS value can be increased (data transmission rate increased) when the packet error rate falls below a predetermined amount. In one embodiment, changes to MCS settings can be made relatively more frequently than changes related to groupings (the grouping and sounding control module 602) and changes to antenna subset selection (smart antenna control module 604).

Each module in module diagram 600 can interact with other modules. For example, when the sounding packet 108 is sent and the beamforming reports 110 and 114 are received, in the grouping and sounding control module 602, then MCS value determination in the MU MIMO rate control module 606 and antenna subset selection in smart antenna control module 604 can be affected. That is, MCS values may change and antenna subset selection may change in response to the sounding packet update. Similarly, the smart antenna control module 604 can select a different subset of antennas from the antenna array 202. The new subset of antennas can affect grouping and sounding control module because new beamforming parameters may be determined. Also, the new subset of antennas can affect the MU MIMO rate control module 606 since the new subset of antennas can require a different MCS value. The MU MIMO rate control module 606 can affect the grouping and the sounding module 602 and the smart antenna control module 604. In one embodiment, data transmission rates (MCS values) can be determined, at least in part, on packet error rates. The MU MIMO rate control module 606 can provide determined MCS values and determined packet error rates to grouping and sounding control module. As described above, MCS values and packet error rates can be used in grouping and sounding module 602 to select STAs to be included in multi-user groups. Also MCS values and packet error rates can be used to select antennas from antenna array 202.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, comparing the performance threshold to the performance measurement described in blocks 314 and 518 can be performed periodically, even after a MU MIMO data transmission has begun. Periodic checking can help beamforming settings and antenna subset selection track changing channel conditions As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
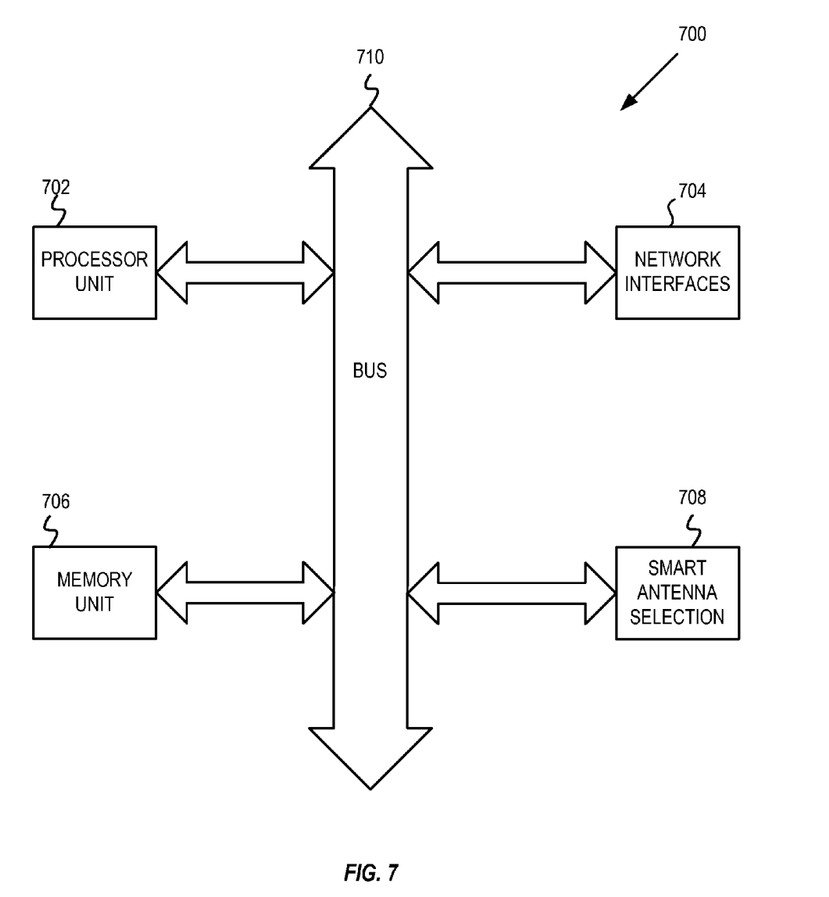
FIG. 7 is a block diagram of an example embodiment of an electronic device including a smart antenna selection module.

FIG. 7 is a block diagram of an example embodiment of an electronic device 700 including a smart antenna selection module. In some implementations, the electronic device 700 may be one of a laptop computer, a tablet computer, a mobile phone, a powerline communication device, a smart appliance (PDA), access point, wireless station or other electronic systems. The electronic device 700 can include processor unit 702 (possibly including multiple processors, multiple cores, multiple nodes, and/or implementing multi-threading, etc.). The electronic device 700 can also include memory unit 706. Memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Electronic device 700 can also include bus 710 (e.g., PCI bus, ISA bus, PCI-Express bus, HyperTransport® bus, InfiniBand® bus, NuBus bus, AHB bus, AXI bus, etc.), and network interfaces 704 that include at least one of a wireless network interface (e.g., a WLAN interface, a BLUETOOTH® interface, a WiMAX interface, a ZigBee® interface, a Wireless USB interface, etc.) and a wired network interface (e.g., an Ethernet interface, a powerline communication interface, etc.). In some implementations, electronic device 700 may support multiple network interfaces—each of which is configured to couple the electronic device 700 to a different communication network.

A smart antenna selection module 708 can include elements and modules described in conjunction with the smart antenna selector 214 and described in operational flow diagrams 300 and 500. In one embodiment, the smart antenna selection module 708 can include functionality to send the sounding packet 108, receive the beamforming reports 110 and 114 and select a subset of antennas from antennas included in the network interfaces 704.

The memory unit 706 can embody functionality to implement embodiments described in FIGS. 1-6 above. In one embodiment, memory unit 706 can include one or more functionalities that facilitate adjusting selecting subsets of STAs to include in a multi-user group, select subsets of antennas for use in a MU MIMO data transmission and compare the performance measurement to the performance threshold. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). Processor unit 702, memory unit 706, network interface 704 and smart antenna selection module 708 are coupled to bus 710. Although illustrated as being coupled to the bus 710, memory unit 706 may be coupled to processor unit 702.

While the embodiments are described with reference to various implementations and exploitations, it will be understood that these embodiments are illustrative and that the scope of the inventive subject matter is not limited to them. In general, techniques for smart antenna selection as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for selecting antennas for multi-user multiple-input multiple-output data transmission comprising:
   logically forming, at an access point including a plurality of antennas, a group of stations using measurements indicating a similarity of performance of the stations;
   selecting a first subset of the plurality of antennas, wherein said selecting the first subset of antennas comprises:
      determining a second subset of antennas used to communicate with a first station of the group, wherein the first station is communicatively coupled to the access point in a first single-user configuration;
      determining a third subset of antennas used to communicate with a second station of the group, wherein the second station is communicatively coupled to the access point in a second single-user configuration; and
      selecting an antenna common to the second subset of antennas and the third subset of antennas;
   receiving a first data transmission responsive to a sounding packet transmitted by the access point using the first subset of antennas; and
   sending a second data transmission based, at least in part, on the first data transmission, wherein the second data transmission is a multi-user multiple-input multiple-output data transmission, wherein the second data transmission is sent using the first subset of antennas.

2. The method of claim 1, further comprising determining whether a modulation coding scheme associated with the first station is similar to a modulation coding scheme associated with the second station.

3. The method of claim 1, further comprising determining whether a queue depth associated with the first station is similar to a queue depth associated with the second station.

4. The method of claim 1, further comprising determining for the sounding packet at least one member selected from a group consisting of a received signal strength, a signal to noise ratio, and packet error rates.

5. The method of claim 1, wherein the first data transmission comprises a first beamforming report from the first station and a second beamforming report from the second station.

6. A non-transitory machine-readable storage medium having instructions stored therein, the instructions to:
   form, at an access point including a plurality of antennas, a group of stations using measurements of the stations;
   select a first subset of antennas of the plurality of antennas, wherein the instructions to select the first subset of antennas comprise instructions to:
      determine a second subset of antennas used to communicate with a first station of the group in a first single user configuration;
      determine a third subset of antennas used to communicate with a second station of the group in a second single user configuration; and
      select an antenna common to the second subset of antennas and the third subset of antennas;
   receive a first data transmission responsive to a sounding packet transmitted from the first subset of antennas; and
   send a second data transmission based, at least in part, on the first data transmission, wherein the second data transmission is a multi-user multiple-input multiple-output data transmission, wherein the second data transmission is sent using the first subset of antennas.

7. The non-transitory machine-readable storage medium of claim 6, further comprising instructions to determine whether a modulation coding scheme associated with the first station is similar to a modulation coding scheme associated with the second station.

8. The non-transitory machine-readable storage medium of claim 6, further comprising instructions to determine whether a queue depth associated with the first station is similar to a queue depth associated with the second station.

9. The non-transitory machine-readable storage medium of claim 6, further comprising instructions to determine for the sounding packet at least one member selected from a group consisting of a received signal strength, a signal to noise ratio, and packet error rates.

10. The non-transitory machine-readable storage medium of claim 6, wherein the first data transmission comprises a first beamforming report from the first station and a second beamforming report from the second station.

11. A device comprising:
   means for forming, at an access point including a plurality of antennas, a group of stations using measurements indicating a similarity of performance of the stations;
   means for selecting a first subset of antennas of the plurality of antennas, wherein the means for selecting the first subset of antennas further comprises:
      means for determining a second subset of antennas used to communicate with a first station from the group in a first single-user configuration;
      means for determining a third subset of antennas used to communicate with a second station from the group in a second single-user configuration, wherein the second station is communicatively coupled to the access point; and
      means for selecting an antenna common to the second subset of antennas and the third subset of antennas;
   means for receiving a first data transmission responsive to a sounding packet transmitted from the first subset of antennas; and
   means for sending a second data transmission based, at least in part, on the first data transmission, wherein the second data transmission is a multi-user multiple-input multiple-output data transmission, wherein the second data transmission is sent using the first subset of antennas.

12. The device of claim 11, further comprising means for determining whether a queue depth associated with the first station is similar to a queue depth associated with the second station.

13. The device of claim 11, further comprising means for determining for the sounding packet at least one member selected from the group consisting of a received signal strength, a signal to noise ratio, and packet error rates.

14. The device of claim 11, further comprising means for determining whether a modulation coding scheme associated with the first station is similar to a modulation coding scheme associated with the second station.

15. The device of claim 11, wherein the first data transmission comprises a first beamforming report from the first station and a second beamforming report from the second station.

* * * * *